Sept. 28, 1954  C. G. HARMAN ET AL  2,690,065
CERAMIC WARE
Filed Sept. 13, 1951
F I G. 1.
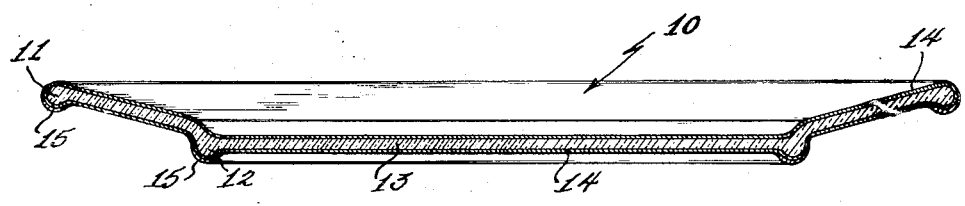
F I G. 2.
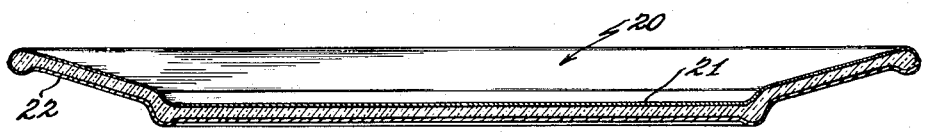
INVENTOR
**CAMERON G. HARMAN
HAL H. RICE
WILLIAM J. KOCH**
BY
ATTORNEYS Patented Sept. 28, 1954

2,690,065

UNITED STATES PATENT OFFICE 2,690,065

CERAMIC WARE

Cameron G. Harman and William J. Koch, Columbus, Ohio, and Hal H. Rice, Indianapolis, Ind., assignors, by direct and mesne assignments, to Vitrified China Association, Inc., Washington, D. C., a corporation of Ohio Application September 13, 1951, Serial No. 246,396

6 Claims. (Cl. 65—15)

1

This invention relates to the manufacture of china and more particularly to a novel vitreous surfaced ceramic article and a method of preserving the vitreous surface of ceramic ware.

China, particularly of the type known as institutional or hotel ware, is manufactured by the shaping of plastic clay body and firing of the formed body to form a bisque. The bisque is then coated with suitable glaze materials and again fired to temperatures to vitrify the glaze to form an article having a glazed surface of high gloss. Ordinarily, the ware, particularly in institutional and hotel china, is made of sufficient thickness to form a strong, rugged article able to withstand the mechanical abuse in various stages of manufacture, shipping, service, and the like. The strength and ruggedness of the ware, and its resultant long life, make it important that the surface of the ware be strongly resistant to scuffing and scratching.

China used in hotels and restaurants is subjected to extremely rough handling as it is stacked by bus boys for removal from the table after use, stacked for passing through the dishwasher, and then stacked on the service counter. During each of these operations, the glazed surface of the ware comes into wearing contact with wear-producing areas of other pieces of ware which form scratches in the glaze, causing the ware to lose its gloss. For example, when plates are stacked, the foot and rolled edge come into damaging contact with the upper surface of the plate on which it is stacked to scratch the upper surface. Hence, the foot and rolled edge of plates are the wear-producing areas. The scratches, in addition to being objectionable from an appearance standpoint, provide recesses which are difficult to clean, and hence, provide lodging places for bacteria, minute food particles, dust, dirt, and other contaminants.

The scuffing resulting from the friction of one piece of ware with another is accentuated by rough handling frequently attendant to mechanical dishwashers in common use at the present time, and also is accentuated by the high tem-

2 peratures and strong detergents ordinarily employed in mechanical dishwashing. These conditions, along with the acids of the food particles, cause chemical attack on the glaze accelerating the scuffing and reduction in gloss of the surface of the ware.

It is an object of this invention to provide a novel vitreous surfaced ceramic article characterized by an improved resistance to scuffing of the vitrified surface.

Another object of this invention is to provide a novel ceramic product in which the glaze is of different hardness in selected areas.

It is also an object of this invention to provide a vitreous surfaced ceramic article having its wear-producing areas coated with a soft glaze material.

Another object of this invention is the provision of a vitreous surfaced ceramic article in which selected areas are coated with a glaze matured at a temperature lower than the glaze in the other areas.

A further object of this invention is the provision of novel vitreous surfaced ceramic plates, bowls, saucers, and the like, having a soft glaze covering the feet and rolled edges of the ware.

It is also an object of this invention to provide a method of protecting vitreous surfaced ceramic ware from scuffing during use.

Still another object of this invention is the provision of a novel method of manufacturing vitreous surfaced ceramic articles characterized by a high resistance to scuffing of the vitrified surface.

With these and other objects in view, as will become apparent from the following description, this invention resides in a novel vitreous surfaced ceramic article having glazes of different hardnesses covering selected areas of the article.

In the drawings:

Figure 1 is an elevational view, partially in cross-section, of a plate manufactured according to a preferred embodiment of this invention; and Figure 2 is also an elevational view, partially in cross-section, of a second embodiment of this invention as applied to a plate.

This invention will be described as applied to institutional or hotel ware and more particularly to the manufacture of a plate. It is to be understood that the invention is not limited to these particular applications which are described only for purposes of illustration and that the invention may be employed in the manufacture of dinner ware and also of ware of other shapes.

In the preparation of the ware, a plastic clay body is shaped by any suitable means, such as by a jigger, to the desired shape and is dried and bisque fired in the normal manner. In a preferred embodiment of this invention the bisque fired ware is then coated with a conventional glaze and is glost fired in the usual manner to provide a vitreous surface extending over the entire outer surface of the body. A "soft" glaze is then applied as an overglaze over selected wear-producing areas of the body and the ware fired to vitrify the "soft" glaze.

Referring to Figure 1, a plate, indicated generally by 10, is shown partially in section having a rolled edge 11 and a foot 12 which normally are the wear-producing areas of the plate causing scuffing during use of the plates. As a plate is taken from a stack either the foot 12 or the lower surface of the rolled edge 11, or both, will ordinarily strike, rub or otherwise contact the immediately adjacent plate to cause scuffing.

The plate 10 consists of a bisque fired body 13 covered by a conventional commercial type vitreous glaze 14 extending over the entire surface of the bisque. The glaze 14 is applied in the usual manner such as by brushing, dipping, or spraying, and is vitrified in place by a glost firing operation. A "soft" glaze is then applied to the lower surface of the rolled edge 11 and foot 12 by conventional methods such as brushing, dipping, or spraying and firing the thus coated plate to mature the "soft" glaze at as low a temperature as possible consistent with the formation of a vitrified continuous, matured glaze.

In general, the glazes offering most promise produced in this invention are those covered by the lead borosilicate systems. The essential characteristic of the "soft" glaze employed as a coating for the wear-producing areas is that it be "soft" as compared with the glaze on the "eating" surface of the ware. Whether or not the glaze is "soft" will depend on the temperature of glost firing as well as the composition of the glaze. A glaze composition that may be glost fired to form a vitreous, fully matured soft glaze at a low temperature, for example 800° C., will become increasingly hard as the temperature of glost firing is increased. Hence, a glaze coating that will drastically reduce scuffing when applied to the wear-producing areas and glost fired at a temperature of 800° C. may be wholly unsatisfactory when glost fired at cone 5. Some glaze compositions that have been employed in the preparation of novel scuff-resistant ware of this invention are set forth in the following table. It is to be understood that the compositions that are listed are merely for purposes of illustration and in no way limit the scope of this invention.

*Table I*

| Sample No. | Chemical Composition, by Weight | | | |
|---|---|---|---|---|
| | PbO | Al₂O₃ | B₂O₃ | SiO₂ |
| | Percent | Percent | Percent | Percent |
| 1 | 66.5 | 1.98 | 16.8 | 14.7 |
| 2 | 82.6 | 1.4 | | 16.0 |
| 3 | 61.06 | | 18.0 | 20.94 |
| 4 | 50.0 | 3.0 | 25.0 | 22.0 |

A standard measure of the hardness of a glaze is known as the Knoop hardness. While the Knoop hardness is only one property of the glaze of importance in connection with these scuffing or scratching characteristics, it does provide an indication of glazes satisfactory for the preparation of ware according to this invention. In this connection, a glaze composition normally providing a "soft" glaze when fired at a temperature that is low, but sufficient to produce a mature glaze, will increase with an increase in the glost firing temperature and may have a high Knoop hardness approaching the hardness of conventional glazes ordinarily used on hotel ware if heated to the usual glost firing temperatures. The hardness of several glaze compositions fired to cone 5 (1230° C.) are illustrated in Table II.

*Table II*

| Glaze No. | Chemical Composition, by Wt. | | | | Firing Treatment | Knoop Hardness, 500 gm. load |
|---|---|---|---|---|---|---|
| | PbO | Al₂O₃ | B₂O₃ | SiO₂ | | |
| | Percent | Percent | Percent | Percent | | |
| 5 | 38.1 | 5.0 | 18.8 | 38.1 | Cone 5 (1,230° C.) Regular Production Kiln. | 417 |
| 6 | 47.8 | 5.0 | 18.8 | 28.4 | Cone 5 Regular Production Kiln. | 453 |
| 7 | 52.8 | 5.0 | 13.8 | 28.4 | do | 447 |
| 8 | 60.0 | 4.0 | 10.0 | 26.0 | do | 435 |
| Plant 4 Glaze | | | | | do | 471 |
| Do | | | | | Regular Production | 487 |
| Low Temp. Overglaze | | | | | 1,140° F., Laboratory furnace | 306 |

The temperatures at which the "soft" glazes are matured in producing ware according to the preferred form of this invention described above will generally range downward from 800° C., the highest temperature normally employed in commercial decorating operations. Temperatures somewhat above 800° C. can also be employed but ordinarily will result in a gradual decrease in the beneficial results of this invention because of the increased hardness of the glaze. In addition to its effects on the refractory properties of the glaze, per se, a high firing temperature promotes reaction of the "soft" overglaze with the normal glaze and the body and the overglaze approaches the characteristics of those materials.

A series of accelerated use tests was made on regular run-of-plant hotel china and china protected by a "soft" glaze on the wear-producing areas. Plates were placed in a machine and abraded with other plates in the presence of detergent, water and materials simulating the acids and slimes from foods. The gloss of the surface of the china was measured at eight hour intervals to provide an indication of the scuffing of the surface. It is estimated that forty-eight hours in the accelerated test duplicates the scuffing which hotel china would receive in approximately twenty-eight years of normal use. The results of accelerated use tests are set forth in Table III.

Table III
RESULTS OF ACCELERATED USE TESTS ON PLATES

| Composition of Overglaze Coating Sample No.[1] | Temp. of Maturing of Overglaze Coating | Residual Gloss, Percent After Accelerated Use Test | | | | | |
|---|---|---|---|---|---|---|---|
| | | 8 Hours | 16 Hours | 24 Hours | 32 Hours | 40 Hours | 48 Hours |
| 1 | 800° C | 98.5 | 97 | 95.5 | 92 | 90 | 88 |
| 2 | 800° C | 98 | 92 | 88 | 85.5 | 82 | 79 |
| Untreated Commercial Plant Glaze. | Cone 5 | 73 | 59 | 46 | 40 | 35 | 34 |

[1] Compositions correspond to the sample numbers in Table I.

A second embodiment of this invention is illustrated in Figure 2 of the drawings in which a plate 20 is illustrated with the normal glaze 21 covering its upper or "eating" surface and a "soft" glaze 22 covering the rolled edge and entire back of the plate. In the accelerated use tests on the embodiment of the invention illustrated in Figure 1, it was noticed that chipping of some of the "soft" overglaze from the wear-producing areas gradually exposed the normal plant glaze on those areas and resulted in an increased rate of wear during the latter portions of the tests. By applying the "soft" glaze directly to the bisque on the rolled edge and entire back of the plate, chipping of the "soft" glaze to expose the hard, normal plant glaze is eliminated.

Another advantage of this invention lies in the protection of decal overglaze decorated ware. The protective "soft" glaze can be applied according to the forms of the invention illustrated in either Figures 1 or 2 and matured during the decorative firing operation. A series of accelerated use tests were run to compare the embodiment of the invention illustrated in Figure 2, and the application of the invention to decal overglaze decorated ware, with the normal run-of-the-plant hotel china. The results of the tests are illustrated in Table IV. Each of the tests simultaneously abraded the upper surface of one plate with an untreated plant glaze plate and a plate having its wear-producing areas coated with a "soft" glaze.

It will be appreciated that the particular areas covered by the "soft" glaze will depend upon the shape and design of the ware to be protected. For instance, dinner ware, which ordinarily does not have a rolled edge, may have a coating of the soft glaze along the foot and on the outer surface of the edge. Ordinarily dinner ware, being of a more fragile nature than institutional ware, is not subjected to as severe scuffing as institutional ware or hotel ware and scuffing is not as important in determining the life of the ware. Ordinarily, the wear-producing areas will be convex surfaces or protuberances which come in contact with other ware during normal service. In cups, for example, the "soft" glaze may be applied to the outer surface of the handle and the inner surface of the rim.

Another method of preparing the novel scuff-resistant ware of this invention is to coat bisque fired ware with a glaze of one composition on the "eating" surfaces and with a glaze of a different composition on the wear-producing areas, and then fire the thus coated ware to vitrify both glazes in a single glost firing step. In this procedure, the two glazes must have different hardnesses following vitrification to produce ware having the desired "soft" glaze on the wear-producing areas. It is apparent that the glaze composition applied to the wear-producing areas must possess the desired properties necessary of adhering to the ware and forming a smooth continuous glaze and also must form a glaze that is soft even when fired at the temperatures necessary for maturing the harder glaze on the "eating" surface. In this form of the invention, savings are made possible by eliminating one of the glost firing steps of the previously described procedure.

The china of this invention possesses a resistance against scuffing approximately ten times

Table IV

| Sample Identification | Temp. of Maturing | Residual Gloss, Percent After Accelerated Use Test | | | | | |
|---|---|---|---|---|---|---|---|
| | | 8 Hours | 16 Hours | 24 Hours | 32 Hours | 40 Hours | 48 Hours |
| Coating #1—2 coats on rolled edge and foot. | 800° C | 98 | 96 | 95 | 94 | 84 | 75 |
| Untreated Plant Glaze. | Cone 5 | 61 | 48 | 32 | 27 | 24 | 23 |
| Coating #4—rolled edge and entire back. | 800° C | | | | | | 94.27 |
| Untreated plant glaze. | Cone 5 | | | | | | 34.2 |
| Coating #4—rolled edge and entire back of decal decorated ware. | 800° C | | | | | | 93.8 |
| Untreated plant glaze, decal overglaze decorated. | Cone 5 | | | | | | 58.8 | that of the conventional hotel ware heretofore available. The greatly improved scuffing resistance results from the application of "soft" materials at selected areas, and not merely from an increase in the hardness of the glazed surface of the table ware. The provision of dissimilar surfaces on the wear-producing and wearing areas of the ceramic articles apparently eliminates seizure, and the resultant scuffing, when two pieces of ware are rubbed together. In the formation of the desired "soft" or fusible glaze on the wear-producing areas, the refractory characteristics are determined by the temperature of maturing of the glaze, which is accomplished at a low temperature, preferably below about 800° C.

While this invention has been described in detail with respect to a particular modification of the invention, it is to be understood that the concept of this invention is not limited to those details, but is determined by the scope of the appended claims.

We claim:

1. Ceramic table ware of a shape adapting it to be stacked with other pieces of substantially similar ware, having accentuated wear-producing areas which when stacked, normally lie in abrasive contact with the glazed surface of an adjacent piece, a glaze on the major portion of the article, and a glaze of lesser wear-producing characteristics on the wear-producing areas thereof.

2. A vitreous surfaced ceramic article of a shape adapting it to be stacked with other pieces of substantially similar ware comprising a bisque fired body having accentuated wear-producing areas which when stacked, normally lie in abrasive contact with the glazed surface of an adjacent piece, a relatively hard glaze covering substantially the entire surface of said body, and a relatively softer glaze coating on the wear-producing areas of the body.

3. A china plate of a shape adapting it to be stacked with other plates of substantially similar shape, comprising a bisque fired body having accentuated wear-producing areas including a foot portion, which when stacked, normally lie in abrasive contact with the glazed surface of an adjacent piece, a relatively hard glaze covering substantially the entire surface of said body, and a relatively soft overglaze coating of lesser wear-producing characteristics on the foot and edge of the plate.

4. A china plate of a shape adapting it to be stacked with other plates of substantially similar shape comprising a bisque fired body having a relative hard glaze covering substantially the entire upper surface thereof, and a relatively soft overglaze coating of lesser wear-producing characteristics on the entire back of the plate.

5. An institutional china plate of a shape adapting it to be stacked with other pieces of substantially similar ware, comprising a bisque fired body having a rolled edge and a foot, a relatively hard glaze on the upper surface of the plate and a relatively soft glaze of lesser wear-producing characteristics on the rolled edge and foot.

6. A china plate of a shape adapting it to be stacked with other plates of substantially similar shape, comprising a bisque fired body, a relatively hard glaze on the upper surface thereof, and a relatively soft glaze of lesser wear-producing characteristics on the edge and back of the plate.

References Cited in the file of this patent

UNITED STATES PATENTS

| Number | Name | Date |
|---|---|---|
| 63,653 | Rand | Apr. 9, 1867 |
| 322,290 | Hines | July 14, 1885 |
| 340,027 | Allen | Apr. 13, 1886 |
| 740,040 | Perkiewicz | Sept. 29, 1903 |
| 1,693,252 | Prouty | Nov. 27, 1928 |
| 1,784,392 | Rowland | Dec. 9, 1930 |
| 1,813,551 | Smith | July 7, 1931 |
| 1,849,272 | Brown | Mar. 12, 1932 |
| 1,987,683 | Hunt et al. | Jan. 15, 1935 |
| 2,018,600 | Brown | Oct. 22, 1935 |
| 2,083,741 | Pearson | June 15, 1937 |